US012645823B2

(12) United States Patent
Sharma et al.

(10) Patent No.: US 12,645,823 B2
(45) Date of Patent: Jun. 2, 2026

(54) IDENTITY DOMAIN SNAPSHOT CONSUMPTION USING VERSIONING AND RELATED SYSTEMS AND METHODS

(71) Applicant: Oracle International Corporation, Redwood Shores, CA (US)

(72) Inventors: Pranjal Sharma, Covington, WA (US); Guhan Ravi, Kirkland, WA (US); Hitesh Gupta Tumsi Ramesh, Seattle, WA (US)

(73) Assignee: Oracle International Corporation, Redwood Shores, CA (US)

( * ) Notice: Subject to any disclaimer, the term of this patent is extended or adjusted under 35 U.S.C. 154(b) by 31 days.

(21) Appl. No.: 18/752,299

(22) Filed: Jun. 24, 2024

(65) Prior Publication Data

US 2025/0390596 A1 Dec. 25, 2025

(51) Int. Cl.
*G06F 21/62* (2013.01)
*G06F 11/1446* (2026.01)

(52) U.S. Cl.
CPC ...... *G06F 21/6218* (2013.01); *G06F 11/1464* (2013.01); *G06F 2201/815* (2013.01); *G06F 2201/84* (2013.01); *G06F 2221/2141* (2013.01)

(58) Field of Classification Search
CPC ............. G06F 21/6218; G06F 11/1464; G06F 2201/815; G06F 2201/84; G06F 2201/2141
See application file for complete search history.

(56) References Cited

U.S. PATENT DOCUMENTS

| | | | |
|---|---|---|---|
| 10,250,585 | B1 | 4/2019 | Golwalkar |
| 11,818,114 | B2 | 11/2023 | Olden et al. |

(Continued)

FOREIGN PATENT DOCUMENTS

| | | |
|---|---|---|
| CN | 105991592 A | 10/2016 |
| EP | 3953841 A1 | 2/2022 |
| WO | 2008/042907 A2 | 4/2008 |

OTHER PUBLICATIONS

"Local authentication, registration, and other settings," Retrieved from https://learn.microsoft.com/en-us/power-pages/security/authentication/set-authentication-identity, Aug. 7, 2023, pp. 10.

(Continued)

*Primary Examiner* — Jonathan A Bui
(74) *Attorney, Agent, or Firm* — Invoke

(57) ABSTRACT

Techniques for identity domain snapshotting and snapshot consumption using versioning are disclosed. A snapshot of an updated identity domain is received and applied to an identity domain to change the active version of the identity domain from a prior current version to the updated version. The snapshot is consumed by loading data objects in a hierarchical manner into an updated identity domain. While data objects belonging to the snapshot are loaded during consumption of the snapshot, client traffic continues to be served by the prior, non-updated version of the identity domain. Once consumption of the snapshot is completed successfully, the updated version of the identity domain becomes the active version. The prior version is then recorded in a cleanup table denoting that cleanup operations shall be performed for entities related to the data objects and associated with the prior version.

20 Claims, 7 Drawing Sheets

(56) References Cited

U.S. PATENT DOCUMENTS

| | | | | |
|---|---|---|---|---|
| 12,197,296 | B1* | 1/2025 | Gussin | ............... G06F 11/1451 |
| 2003/0009431 | A1* | 1/2003 | Souder | .................... G06F 16/27 |
| 2003/0167380 | A1* | 9/2003 | Green | ................... G06F 12/023 |
| | | | | 714/E11.119 |
| 2009/0055607 | A1* | 2/2009 | Schack | ................ G06F 16/174 |
| | | | | 711/E12.103 |
| 2010/0161556 | A1* | 6/2010 | Anderson | ............ G06F 16/174 |
| | | | | 707/638 |
| 2016/0203056 | A1* | 7/2016 | Shimizu | ............. G06F 11/1453 |
| | | | | 707/649 |
| 2016/0335338 | A1 | 11/2016 | Beiter | |
| 2016/0364440 | A1* | 12/2016 | Lee | .................... G06F 11/1471 |
| 2021/0390170 | A1 | 12/2021 | Olden et al. | |
| 2022/0334950 | A1* | 10/2022 | Balan | ........................ G06F 8/60 |
| 2022/0394040 | A1 | 12/2022 | Rottinghuis et al. | |
| 2023/0094990 | A1 | 3/2023 | Tammana et al. | |

OTHER PUBLICATIONS

"Managing a single user with multiple external identities," Microsoft, Apr. 22, 2020, pp. 3.
"Processing Identity data," Retrieved from https://documentation. sailpoint.com/saas/help/setup/identity_processing.html, Retrieved on Aug. 1, 2024, pp. 5.
"Resilience in AWS Identity and Access Management," Retrieved from https://docs.aws.amazon.com/IAM/latest/UserGuide/disaster-recovery-resiliency.html, 2024, pp. 4.
Megouache. L. et al., "Ensuring user authentication and data integrity in multi cloud environment," Human-centric Computing and information sciences, 2020, vol. 10, Issue 15, pp. 20.

* cited by examiner

CLIENT DEVICE(S)
110

INTERFACE(S)
112

APPLICATION(S)
115

ADMINISTRATOR DEVICE(S)
150

INTERFACE(S)
152

APPLICATION(S)
155

APPLICATION SERVER(S)
120

AUTHENTICATION SERVICE
122

AUTHORIZATION SERVICE
124

APPLICATION(S)
125

IDENTITY STORAGE SERVICE
130

SNAPSHOT PROCESSOR
132

IDENTITY DOMAIN ACTIVATOR
134

IDENTITY SYNCHRONIZATION SERVICE
136

ROLLBACK SERVICE
138

IDENTITY DOMAIN MONITOR
140

ANOMALY DETECTOR
142

SNAPSHOT GENERATOR
144

DATA REPOSITORY(IES)
180

DOMAIN TABLE DATA
181

DOMAIN LOOKUP TABLE DATA
182

METADATA
185

USER TABLE DATA
183

DOMAIN CLEANUP TABLE DATA
184

APPLICATION DATA
186

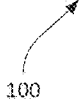

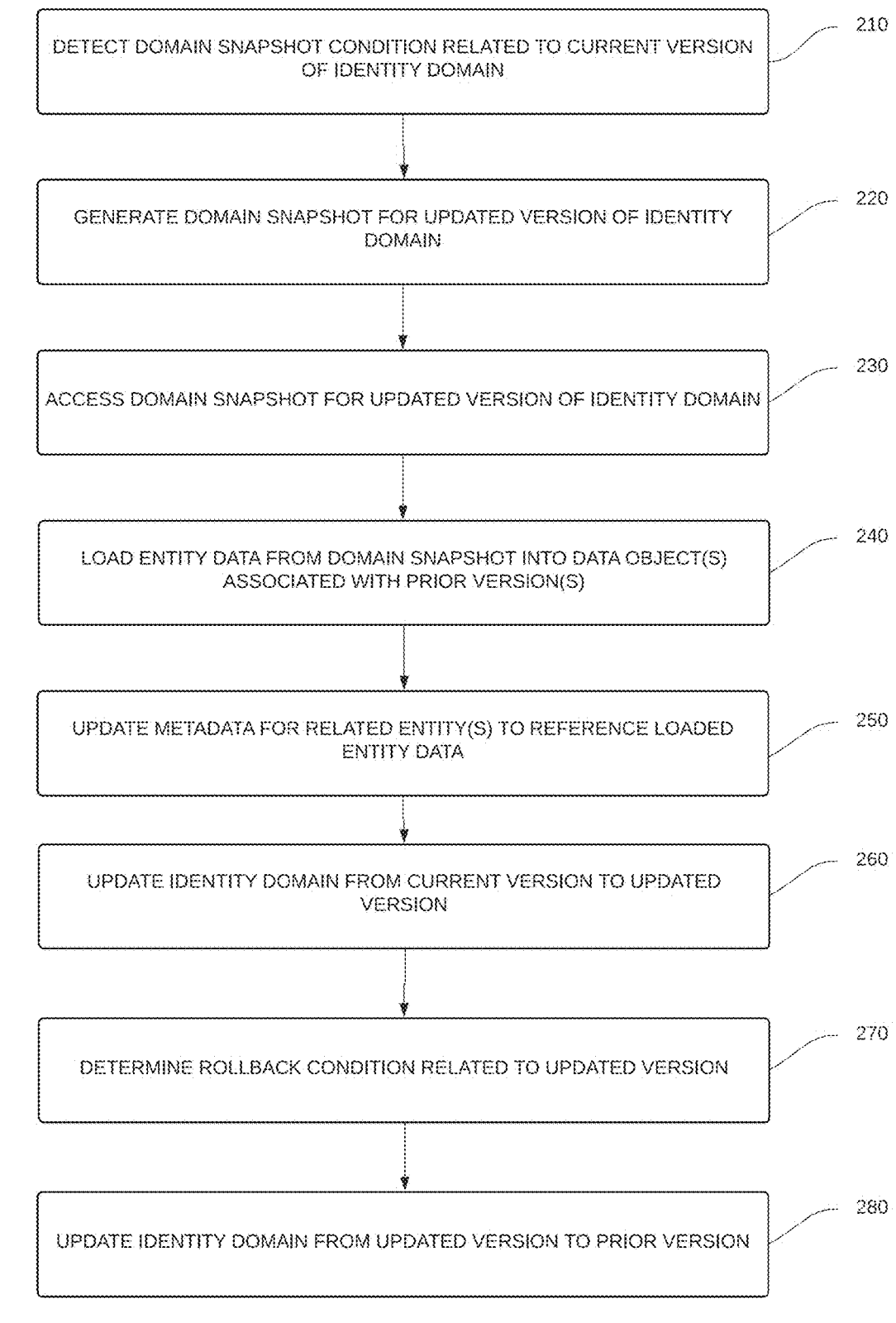

DETECT DOMAIN SNAPSHOT CONDITION RELATED TO CURRENT VERSION OF IDENTITY DOMAIN — 210

GENERATE DOMAIN SNAPSHOT FOR UPDATED VERSION OF IDENTITY DOMAIN — 220

ACCESS DOMAIN SNAPSHOT FOR UPDATED VERSION OF IDENTITY DOMAIN — 230

LOAD ENTITY DATA FROM DOMAIN SNAPSHOT INTO DATA OBJECT(S) ASSOCIATED WITH PRIOR VERSION(S) — 240

UPDATE METADATA FOR RELATED ENTITY(S) TO REFERENCE LOADED ENTITY DATA — 250

UPDATE IDENTITY DOMAIN FROM CURRENT VERSION TO UPDATED VERSION — 260

DETERMINE ROLLBACK CONDITION RELATED TO UPDATED VERSION — 270

UPDATE IDENTITY DOMAIN FROM UPDATED VERSION TO PRIOR VERSION — 280

| USERS | | | |
|-------|-------|--------|-----------|
| userId | domainId | userName | Attributes |
| userA | domainA | A | Attributes |
| userB | domainB | B | Attributes |
| userC | domainC | C | Attributes |

312 → (userA row)
314 → (userB row)
316 → (userC row)

| USERS | | | | |
|-------|---------|----------|----------|-----------|
| userId | VERSION | domainId | userName | Attributes |
| userA | 0 | domainA | A | Attributes |
| userB | 0 | domainB | B | Attributes |
| userC | 0 | domainC | C | Attributes |
| userA | 1 | domainA | A | Attributes |

322 → (userA, 0 row)
324 → (userB, 0 row)
326 → (userC, 0 row)
328 → (userA, 1 row)

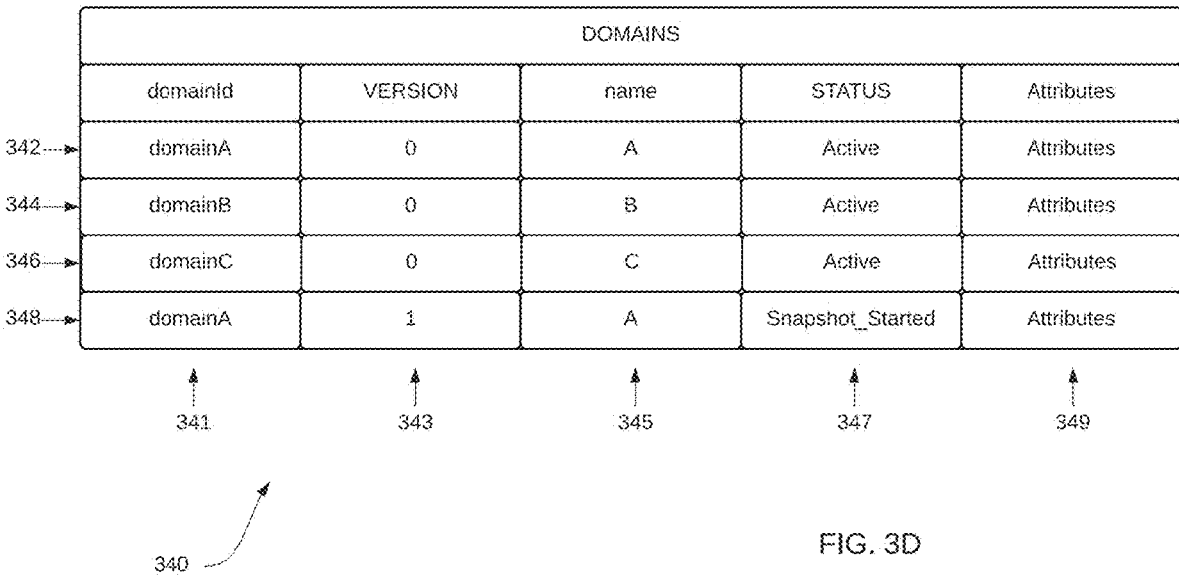

| DOMAINS | | | |
|---|---|---|---|
| domainId | name | STATUS | Attributes |
| domainA | A | Active | Attributes |
| domainB | B | Active | Attributes |
| domainC | C | Active | Attributes |

332 → domainA
334 → domainB
336 → domainC 331 333 335 337

| DOMAINS | | | | |
|---|---|---|---|---|
| domainId | VERSION | name | STATUS | Attributes |
| domainA | 0 | A | Active | Attributes |
| domainB | 0 | B | Active | Attributes |
| domainC | 0 | C | Active | Attributes |
| domainA | 1 | A | Snapshot_Started | Attributes |

342 → domainA
344 → domainB
346 → domainC
348 → domainA 341 343 345 347 349

| DOMAIN LOOKUP | | |
|---|---|---|
| domainId | Version | Status |
| domainA | 0 | Active |
| domainB | 0 | Active |
| domainC | 0 | Active |
| domainA | 1 | Snapshotting |

351                353                355

| DOMAIN LOOKUP | | |
|---|---|---|
| domainId | Version | Status |
| domainB | 0 | Active |
| domainC | 0 | Active |
| domainA | 1 | Active |
| domainC | 1 | Ingestion_Failed |
| domainC | 2 | Snapshotting |

361                363                365

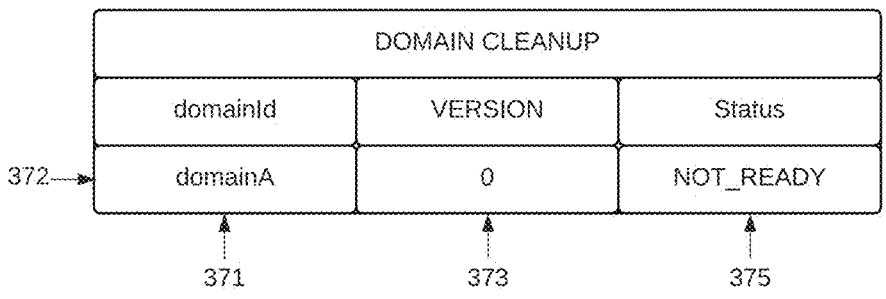
FIG. 3G
370
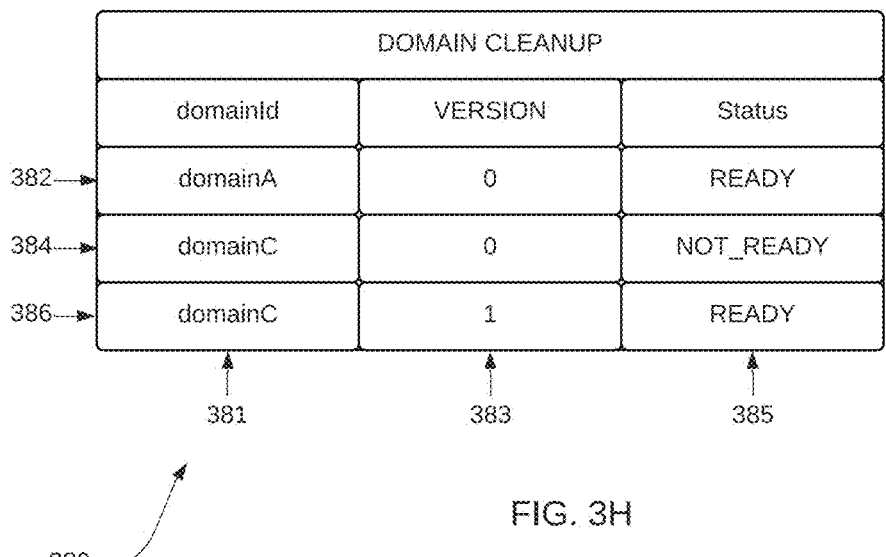
FIG. 3H
380

IDENTITY DOMAIN SNAPSHOT CONSUMPTION USING VERSIONING AND RELATED SYSTEMS AND METHODS

TECHNICAL FIELD

The present disclosure relates to identity domain snapshot consumption using versioning, such as by using a versioned identity domain snapshot to update an identity domain used by one or more services.

BACKGROUND

In cloud computing and Software as a Service (SaaS) systems, resources are managed based on domains and tenancies corresponding to entities or users of the system. Domains and tenancies provide organizational structures defining how entities access and utilize resources within the cloud environment. Entity identity data determines what resources entities are able to access. Cloud computing systems may store and access entity identity data from cloud object storage, distributed data systems, or other storage locations.

A domain is a virtual space allocated within the cloud infrastructure for one or more particular entities. Domains are built from units of data organization to dictate what resources are unique to what user(s). Multiple domains often coexist within the same cloud infrastructure that are isolated from one another for security and privacy and to ensure that resources allocated to one entity remain inaccessible to other entities. For example, in a cloud email service or bank service, subscribing entities have unique domains so that their accounts, settings, and security configurations are separate from those of others. Tenancy refers to the relationships between clients and service providers that govern how resources are allocated, authenticated, authorized, and maintained within the cloud environment. Tenancies typically include multiple users and roles. An identity domain for a tenancy is a data container used for managing the users and roles. For example, tenancies for online services such as email, banking, or reservation making services typically include identity domains for various types of users.

Inconsistencies in domain or tenancy data may occur due to bugs, anomalies, data corruption, or race conditions occurring at a source level. These problems impact the safety, stability, and functionality of cloud systems relying on the domains. If such issues are not addressed, customers may experience a lapse in service or have inconsistent experiences, or the system may be exposed to vulnerabilities. Updating a system to fix an inconsistency or bug traditionally causes significant downtime as the update is applied, particularly for situations in which a domain is a large dataset and/or includes dependencies or interrelationships between entities.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the Figures of the accompanying drawings. It should be noted that references to "an" or "one"

embodiment in this disclosure are not necessarily to the same embodiment, and they mean at least one. In the drawings:

FIG. 1 illustrates an example system for identity domain snapshot consumption using versioning, in accordance with one or more embodiments; and FIG. 2 illustrates an example set of operations for identity domain snapshot consumption using versioning in accordance with one or more embodiments.

FIGS. 3A-3H illustrate an example of identity domain snapshot consumption using versioning, in accordance with one or more embodiments.

DETAILED DESCRIPTION

Figures 3E, 3F:
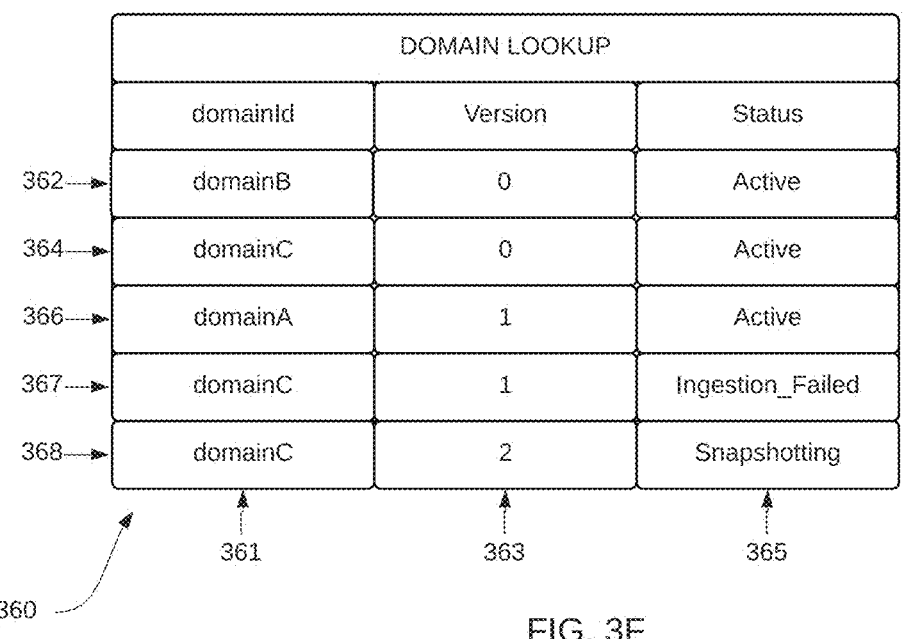

In the following description, for the purposes of explanation, numerous specific details are set forth to provide a thorough understanding. One or more embodiments may be practiced without these specific details. Features described in one embodiment may be combined with features described in a different embodiment. In some examples, well-known structures and devices are described with reference to a block diagram form to avoid unnecessarily obscuring the present disclosure.

1. GENERAL OVERVIEW
2. EXAMPLE SYSTEM FOR IDENTITY DOMAIN SNAPSHOT CONSUMPTION USING VERSIONING
3. EXAMPLE OPERATIONS FOR IDENTITY DOMAIN SNAPSHOT CONSUMPTION USING VERSIONING
4. EXAMPLE OF IDENTITY DOMAIN SNAPSHOT CONSUMPTION USING VERSIONING
5. COMPUTER NETWORKS AND CLOUD NETWORKS FOR IDENTITY DOMAIN SNAPSHOTTING AND CONSUMPTION
6. MICROSERVICE APPLICATIONS FOR IDENTITY DOMAIN SNAPSHOTTING AND CONSUMPTION
7. HARDWARE OVERVIEW
8. MISCELLANEOUS; EXTENSIONS; OTHER CONSIDERATIONS

1. GENERAL OVERVIEW

Techniques for identity domain snapshotting and/or consumption using versioning and related methods and systems are disclosed herein. Identity domain snapshotting using versioning and/or containerization reduces or eliminates disruption of client service during application of updates to and/or during resolution of bugs or inconsistencies present in identity domains and/or tenancies.

Many applications utilize various cloud identity services. For example, identity authorization, identity authentication, and identity storage services maintain correct access control restrictions for different tenancies and/or domains within a system. Inconsistencies in identity domains can lead to failures and/or vulnerabilities in the system. To repair inconsistencies or bugs, an updated identity domain configuration is determined and/or created that fixes, or is intended to fix, the bug or inconsistency. The updated, fixed version of the identity domain is snapshotted (e.g., a snapshot is generated for the updated version), and the snapshot of the updated version is then consumed such that the updated version becomes the active version for the identity domain of the system.

To reduce client downtime and optimize the speed of consuming a snapshot, data objects that are copied are versioned and/or containerized as the snapshot is consumed. Metadata entries for entities related to copied data objects are updated to point to the copied data objects without having to be copied in entirety. Once the snapshot consumption is complete, the active version of the identity domain is changed from the current version to the updated version of the identity domain. Inconsistencies and downtime are not experienced by client devices when executing applications that rely on identity authorization, identity authentication, and/or identity storage services using the identity domain. Also, possible lag for deletions being purged from the system is reduced.

Applicant notes that other embodiments may include a system or other method of performing the operations as described herein.

While this General Overview section provides a general overview, Applicant notes that additional embodiments and related combinations of features may be described in this Specification and/or recited in the claims outside of this General Overview section.

2. EXAMPLE SYSTEM FOR IDENTITY DOMAIN SNAPSHOTTING USING VERSIONING AND CONTAINERIZATION

FIG. 1 illustrates an example system 100 for identity domain snapshotting and/or snapshot consumption using versioning, in accordance with one or more embodiments. As illustrated in FIG. 1, system 100 includes one or more client devices 110, one or more application servers 120, an identity storage service 130, an identity domain monitor 140, one or more administrator devices 150, and one or more data repositories 180. In various embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In various embodiments, the one or more client devices 110 are various computing devices used to access the application server 120. For example, a laptop, desktop, smartphone, or other computing device is used to access an email account, file system, or bank account using an application stored on the device or using a web browser to access a web-based application. Interface(s) 112 facilitates communication between one or more computing devices, as described further below. Networked resources are accessed via one or more local applications 115 and/or one or more web-based applications 125 that are hosted on the one or more application servers 120.

The one or more application servers 120 include one or more web-based applications 125 and various services. The application server 120 is a software framework that provides authentication, authorization, and/or other identity services for the one or more web-based applications 125 (or local applications 115). In various embodiments, the application server 120 provides other features such as scaling, load balancing, and/or resource allocation. In the example, the application server 120 hosts the applications 125, an authentication service 122 and an authorization service 124.

The authentication service 122 verifies the identity of a user or other entity. The authentication service 122 is responsible for confirming the identity of users attempting to access resources or services within the cloud environment. In cloud computing, authentication services often use various methods such as passwords, multi-factor authentication (MFA), biometrics, or cryptographic tokens to verify user identities. The authentication service relies on the identity domain to authenticate users and grant access to resources. For example, authentication services check whether an access token is present in a particular domain to determine whether access to a resource is authenticated.

The authorization service 124 determines what actions users or other entities are allowed to perform after they have been authenticated. The authorization service 124 manages permissions and access control policies to enforce security requirements. The authorization service 124 evaluates the permissions associated with an identity and determines whether the identified entity is allowed to perform a requested action or access a particular resource. The authorization service utilizes the identity domain to enforce access control decisions according to user roles, permissions, and access control policies defined by the identity domain. For example, the authorization service 124 may check whether an access control policy in a particular domain grants access to a user to determine whether access to a resource is authorized.

In various embodiments, the applications 125 utilize the authentication service 122 and/or the authorization service 124 to manage relationships between resources used by the applications 125 and the entities (i.e., user, task, service, microservice, etc.) requesting the resources.

The identity storage service 130 includes a snapshot processor 132, an identity domain activator 134, an identity synchronization service 136, and a rollback service 138. The identity storage service 130 includes modules and services for performing operations on an identity domain. The identity storage service 130 is the component of the system 100 that maintains and/or corrects the identity domain for the system 100. In the case of an inconsistency or bug, the identity storage service 130 resolves the inconsistency or bug by servicing the identity domain, such as by applying a snapshot of an updated version of the identity domain.

In embodiments, the identity storage service 130 refers to hardware and/or software configured to perform operations described herein for servicing an identity domain, such as by applying an identity domain snapshot. Examples of operations for identity domain snapshot generation, application, and/or consumption, and related operations, are described below with reference to FIG. 2.

The snapshot processor 132 is a component responsible for processing snapshots of identity domains. The snapshot processor 132 handles tasks such as applying the snapshot to update or synchronize identity data. The snapshot processor 132 applies the snapshot to update the state of the identity domain based on the information and configurations captured in the snapshot. Identity management systems use the snapshot to define and/or synchronize user identities, attributes, and access policies across directories, databases, platforms, or other regions.

The snapshot processer 132 includes components such as a data comparison engine that compares the snapshot data with the current state of the identity domain to identify changes or discrepancies and/or an action orchestrator that determines the actions required to synchronize the identity domain with the snapshot, such as provisioning, updating, or deprovisioning actions for user accounts and access permissions. In embodiments, the snapshot processor 132 also includes an audit logger that records actions taken by the snapshot processor 132 and/or a notification system that informs administrators, operators, and/or a rollback service about the outcome of snapshot processing operations, such as errors, discrepancies, or failures encountered during consumption of a snapshot.

The identity domain activator 134 is a component that initiates the process of transitioning the active version of the domain from one version to another by updating the active version of the identity domain from a current version to another version. For example, the identity domain activator 134 handles activating the identity domain to an updated version based on consumption of a snapshot of the updated version completing.

The identity synchronization service 136 maintains synchronization for the separate identities of various users and/or entities. The identity synchronization service 136 maintains consistency and coherence across identity information stored in different systems or directories within the cloud environment. The identity synchronization service 136 ensures that user identities, attributes, and access permissions are synchronized across multiple systems, directories, or domains.

The identity synchronization service 136 facilitates maintaining unified identity management across various cloud services, applications, and platforms. The identity synchronization service 136 synchronizes this information across different systems and directories within the cloud environment, ensuring consistency and reliability. For example, the identity synchronization service 136 may check whether access tokens and/or access control policies match for the same user across different regions. In this context, when user data is stored in different local databases, a set of one or more local databases forms one or more regions distinct from other sets of one or more local databases. The identity synchronization service 136 ensures that the user data for an entity matches for distinct regions.

The rollback service 138 includes modules and components for performing a rollback on the system 100. The rollback service includes microservices that periodically check for rollback conditions and initiate operations to change an active version of the identity domain to a previously stored version of the identity domain. In some embodiments, the rollback service 138 conducts validation and testing procedures. In case of any issues or failures during the activation process, the rollback service 138 may trigger the identity domain activator 134 to revert to a previous version.

The identity domain monitor 140 includes an anomaly detector 142 and a snapshot generator 144. The identity domain monitor 140 determines when an anomaly or inconsistency in an identity domain exists. The identity domain monitor 140 generates, receives, and/or stores an identity domain snapshot of a version of an identity domain. For example, the identity domain monitor 140 notifies an administrator in the case of an anomaly. The identity domain monitor 140 initiates service by the identity storage service 130 responsive to receiving and/or generating a snapshot of an updated version of the identity domain. The identity domain monitor 140 generates a snapshot of a current version of the identity domain to facilitate rollback features.

The anomaly detector 142 includes one or more algorithms used to perform data analysis to identify patterns that are inconsistent or that do not conform to expected behavior, for example by distinguishing between normal behavior and outliers, anomalies, or deviations from normal results of the algorithm. Statistical methods and/or machine learning techniques such as clustering, classification, density estimation, and other techniques can be deployed by the anomaly detector 142. The anomaly detector 142 generates a prompt, alert, or description of any discovered anomalies or inconsistencies in the system 100. The prompt is sent to an administrator device 150.

In some cases, when a new version of the identity domain is applied via a snapshot, a rollback condition is detected by the anomaly detector 142. Responsive to the anomaly detector 142 determining that a rollback condition exists, an active version of the identity domain is changed from the new version of the identity domain to a prior version of the identity domain. The prior version of the identity domain is selected from the most immediately prior version of the identity domain, the last known stable version of the identity domain, or a default version of the identity domain.

The snapshot generator 144 refers to a process or tool that captures a state or configuration of an identity domain. An identity domain represents a collection of entity identities, attributes, access policies, and other related information within a cloud environment. The snapshot generator collects this information about the identity domain stored within the identity domain's directory service or database. The generator 144 captures the configuration settings and policies associated with the identity domain. This may include settings related to authentication methods, password policies, multi-factor authentication requirements, and access control rules. The snapshot generator 144 extracts entity data and/or metadata. Collected data is formatted into a structured representation suitable for storage and/or further processing. In various embodiments, the data is converted into a standardized format such as JSON, XML, or a database schema.

The snapshot generator 144 compiles the entity data into a comprehensive snapshot of the identity domain. This snapshot represents a static view of the snapshotted state of the identity domain at the time of generation. The generated snapshot is stored for possible later consumption. In embodiments, the generated snapshot is stored in an object data storage that is external to or separate from a data storage or data storage container used by the identity storage service 136.

The one or more administrator devices 150 include various computing devices used to administer or operate the system 100. The administrator device(s) 150 receive input from an administrator or operator of the system. An administrator device 150 is used to generate an updated version of an identity domain and/or trigger a snapshot of the updated version of the identity domain. The administrator device 150 is also used to manage snapshots, including setting the number of prior snapshots that are maintained and/or selecting a default snapshot for use responsive to a rollback condition.

In embodiments, a data repository 180 is any type of storage unit and/or device (e.g., a file system, database, collection of tables, or any other storage mechanism) for storing data. Further, a data repository 180 may include multiple different storage units and/or devices. The multiple different storage units and/or devices may or may not be of the same type or located at the same physical site. Further, a data repository 180 may be implemented or executed on the same computing system as each, any, or all components of the system 100. Additionally, or alternatively, a data repository 180 may be implemented or executed on a computing system separate from the components of the system 100. The data repository 180 may be communicatively coupled to the system 100 via a direct connection or via a network.

In FIG. 1, the data repository 180 includes domain table data 181, domain lookup table data 182, user table data 183, domain cleanup table data 184, metadata 185 and application data 186.

The domain table data 181 includes one or more structured database tables that store information about the domains and/or tenancies within the identity management system. Records in the domain table 181 include a domain name, unique identifier (i.e., a domain version), a domain status, and/or any associated attributes, configurations, or policies specific to the domain. Authorization and authentication services utilize the domain table for functions such as retrieving information about the available domains within the system, managing domain configurations, and enforcing domain-specific access control policies.

The domain lookup table data 182 includes one or more database tables that map domain-specific identifiers to their corresponding version and status. The domain lookup table 182 is a reference table for determining version and status information for domain identifiers used in the domain table 181. Authorization and authentication services retrieve domain information for identity-related operations (i.e., authorization, authentication, synchronization, and/or like operations) using the domain lookup table data 182.

The user table data 183 includes one or more database tables that store information about users and/or entities within the identity domain. For example, records in a user table represent users. A row of the user table records data for the user and includes a name, a unique identifier (e.g., user ID or userId), an associated identity domain identifier (e.g. a domainId), a version number for the associated identity domain identifier, and/or other attributes.

Authentication services utilize the user table to validate user credentials during the authentication process to determine the domain associated with the identity of users attempting to access resources or services within the system. Authorization services may also reference the user table to determine entity permissions and access rights. In this context, a user may refer to one or more entities, including very many entities. As one example, a user having multiple entities in some cases refers to a service for which multiple requests for resources made by the service are entities of the service.

In embodiments, the user table data 183 includes a plurality of entity tables for the different types of entities associated with a user. In this case, one, more, or all of the entity tables include a version column. Similarly to the user table except for entities instead of users, a row of an entity table includes an entity name, a unique identifier (e.g., entity ID or entityId), an associated identity domain identifier (e.g. a domainId), a version number for the associated identity domain identifier, and/or other attributes of the entity.

In various embodiments, the entity data includes group memberships, Application Programming Interface ("API") keys, secret keys, access keys, authentication tokens, access control policy definitions, and/or the like. For example, a user identity domain includes entities associated with the user, such as a service making many requests for resources. In some cases, the ability to store entity data is dependent on data objects being present to receive the stored entity data. For example, a traditional system may be unable to assign a group membership to a particular entity until the group is created; and/or may be unable to assign an API token to an entity until the token is created.

The domain cleanup table 184 is a database table used for managing the cleanup of unneeded data within the identity management system. The domain cleanup table 184 contains a record of the identity domains for which an updated version has been successfully applied. The domain cleanup table facilitates periodic cleanup tasks and data hygiene practices on the identity domain to reduce the size of needed data storage. This table is utilized by administrative tools or automated scripts for cleanup processes and/or to identify and/or remove dangling entities.

In this context, a "dangling entity" refers to an entity that has been removed from the identity domain but for which records exist in various user tables. For example, when a group is removed from an identity domain, entities such as API keys associated with that group may still exist in other tables. To remove the dangling entities, the system periodically checks the domain cleanup table 184 to identify domains that are ready for cleanup. Entities in various user tables belonging to the domain identified for cleanup are identified as dangling entities by having a domain identifier matching the domain identified for cleanup. These dangling entities are then removed.

The metadata 185 includes a database table that stores descriptive information or properties about the entities within the identity management system. Metadata attributes may include data type, size, format, creation timestamp, modification history, identifiers, and/or many other attributes. The metadata table provides a centralized repository for managing and querying metadata. In many cases the storage size of the metadata 185 is many times larger than the domain table data 181, the domain lookup table data 182, the user table data 183 and the domain cleanup table data 184. In embodiments, the metadata 185 is stored at a location separate from one or more storage containers containing the domain table data 181, the domain lookup table data 182, the user table data 183 and/or the domain cleanup table data 184.

The application data 186 refers to structured or unstructured data specific to the applications or services integrated with the system 100. This data includes user profiles, preferences, access logs, application-specific configurations stored in dedicated database tables or repositories, or other application data. Authorization and authentication services may interact with application data to enforce access control policies, authenticate users for application-specific resources, and synchronize user attributes or permissions between the identity domain and integrated applications. In embodiments, the application data 186 is stored at a location separate from one or more storage containers containing the domain table data 181, the domain lookup table data 182, the user table data 183 and/or the domain cleanup table data 184.

Information describing the identity domain snapshotting system 100 may be implemented across any of the components within the system 100. However, this information is illustrated within the data repository 180 for purposes of clarity and explanation. Additional embodiments and/or examples relating to computer networks are described below in Section 9, titled "Computer Networks and Cloud Networks for Identity Domain Snapshotting using Versioning."

The system 100 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

In one or more embodiments, an interface refers to hardware and/or software configured to facilitate communication between a user and a system. In FIG. 1, an interface may be used to facilitate communication between one or more computing devices (e.g., including an interface 112 of a client device 110 and/or an interface 152 administrative device 150) and other components of the system 100. Such an interface renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In various embodiments, different components of such an interface are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, interfaces may be specified in one or more other languages, such as Java, C, or C++.

3. EXAMPLE OPERATIONS FOR IDENTITY DOMAIN SNAPSHOTTING USING VERSIONING AND CONTAINERIZATION

FIG. 2 illustrates an example set of operations for identity domain snapshotting using versioning in accordance with one or more embodiments. One or more operations illustrated in FIG. 2 may be modified, rearranged, or omitted all together. Accordingly, the particular sequence of operations illustrated in FIG. 2 should not be construed as limiting the scope of embodiments.

In an embodiment, the system detects a domain snapshot condition related to a current version of an identity domain (Operation 210). For example, a bug or inconsistency is discovered and an administrative user initiates snapshot operations based on determining that snapshotting and snapshot consumption are needed to repair the bug. In some cases, a snapshot request is made automatically. A request, manual or automatic, for a domain snapshot is received or otherwise detected by the system. The system requests a snapshot of an updated or fixed version of the identity domain snapshot.

An updated identity domain snapshot resolving the inconsistency or bug is generated and/or received by the system. For example, an administrative user generates an updated version of the identity domain based on a prior and/or current version of the identity domain. The administrative user resolves the inconsistency or bug present in the current version of the identity domain in the updated version of the identity domain.

The system generates a domain snapshot for the updated version of the identity domain. (Operation 220). The system generates the domain snapshot by copying values for data objects within the updated identity domain into the snapshot. In embodiments, the data is then serialized into a structured format such as JSON or XML. The resulting structured data is then stored in a designated snapshot repository. In embodiments, the structured data is stored in a snapshot repository without necessarily storing accompanying metadata (which may be larger) in the snapshot repository. In such embodiments, entries in a metadata table are updated for data objects contained in the structured data to point to the updated version of the entity data without copying the metadata table. In embodiments, the metadata includes pointers to data storage locations of the data objects.

The system accesses the domain snapshot for the updated version of the identity domain. (Operation 230). For example, the system locates the domain snapshot for the updated version for the identity domain in a data repository storage location and/or copies the domain snapshot into active memory. The system creates a new domain with the same identifier and an incremented version number and stores the new domain in a domain table for the system with a "snapshot_started" state. A new record is also added to a domain lookup table for the domain including the domain identifier, the incremented version number, and a status "snapshotting."

The system loads entity data from the domain snapshot into one or more data objects associated with the current version of the identity domain. (Operation 240). For example, updated data objects are generated for data objects associated with the current version of the identity domain. Entity data is loaded from the domain snapshot into the updated data objects. In embodiments, entity data is loaded for data objects for which there have been changes made in the updated version of the identity domain. Entities represent individual compute instances, in embodiments, and can be organized into group tables and/or user tables. In the example, the entity data is loaded from the domain snapshot into data objects in a hierarchical manner as follows: user creation, group creation, group membership creation, API key creation, API key ownership creation, etc. While the data objects associated with the various entities are still being loaded, the previous version of the domain remains active.

The system updates metadata for related entities to reference loaded entity data (Operation 250). Rather than copying all of the metadata into a new data object, metadata entries for entities related to the data objects from the domain snapshot are updated to point to the new, updated data objects by changing a version number reference in the metadata. Metadata entries for entities related to a user, such as child or dependent entities are updated to point to the new, updated data objects by changing version number references in the metadata entries for the entities to point to the updated version of the entity data tables for the user.

The system updates the identity domain from the current version to the updated version of the identity domain (Operation 260). The system changes the active version of the identity domain from the current version to the updated version. Changing the active version of the identity domain changes which version of the identity domain is accessed by other components of the system. For example, traffic from one or more client devices is routed to the active version of the identity domain. Before the updated version is activated, authorization and authentication services may continue to access identity domain data, such as authentication tokens and digital certificates, from the previous version of the identity domain as the update is being deployed. Once the new entity data has been loaded, the system may seamlessly and near-instantaneously transition to the updated version of the identity domain by changing the active reference to the new entity records. The system applying the updated version of the identity domain in this way resolves the bug or inconsistency. Additionally, the system updated the domain table to change the status for the updated version of the domain from "snapshot_started" to "snapshot_completed".

In embodiments, the system determines a rollback condition related to the updated version (Operation 270). After the active version of the identity domain is changed to the updated version, the system monitors various metrics, run-time behavior characteristics, test results, or other interactions to determine whether the updated version of the identity domain has caused any errors, failures, or other rollback conditions. For example, an anomaly detector may detect an inconsistency in the identity domain, such as an invalid reference pointer or an error resulting from a client request for a resource. In various embodiments rollback conditions include a detected security vulnerability, a data inconsistency, an access control misconfiguration, domain and/or tenancy integration failure, and/or any other unintended system behavior.

In embodiments where a rollback condition is determined, the system updates the identity domain from the updated version to a prior version responsive to the rollback condition. (Operation 280). The system updates the active version of the identity domain to the prior version similarly to how the system updates the active version to the updated version. The prior snapshot is set as the active version of the identity domain. In embodiments, the prior snapshot is selected from a plurality of prior snapshots based on a rollback snapshot selection criterion (e.g., recentness and/or stability).

4. EXAMPLE OF IDENTITY DOMAIN SNAPSHOTTING USING VERSIONING AND CONTAINERIZATION

FIGS. 3a-3h illustrate an example of identity domain snapshotting using versioning and containerization.

FIG. 3a illustrates a user table 310. In FIG. 3a, the user table 310 includes a userId column 311, a domainId column 313, a username column 315, and one or more attributes columns 317. FIG. 3a also includes a first row 312 corresponding to a userA, a second row 314 corresponding to a userB, and a third row 326 corresponding to a userC. For the user table 310, a primary key is userId. Secondary keys for the user table 310 include (userId+domainId) and/or (domainId+userName).

FIG. 3b illustrates a modified user table 320 that has been modified relative to the user table 310 to facilitate versioning. The modified user table 320 includes a userId column 321, a version column 323, a domainId column 325, a username column 327, and one or more attributes columns 329. FIG. 3b also includes a first row 322 corresponding to a userA, a second row 324 corresponding to a userB, a third row 326 corresponding to userC, and a fourth row 328 also corresponding to userA. In FIG. 3b, the version column 323 has been added to the modified user table 320 relative to the user table 310. The first row 322 and the fourth row 328 of the modified user table 320 both correspond to the userA, but the first row 322 has a version 0 and the fourth row 328 has a version 1, as illustrated in the version column 323 of the modified user table 320. For the modified user table 320, a primary key is (userId+version). Secondary keys for the modified user table 320 include (version+domainId+user-Name) and/or (version+domainId).

FIG. 3c illustrates a domain table 330. In FIG. 3c, the domain table 330 includes a domainId column 331, a name column 333, a status column 335, and one or more attributes columns 337. The domain table 330 also includes a first row 332 corresponding to a domainA, a second row 324 corresponding to a domainB, and a third row 326 corresponding to a domainC. For the domain table 330, a primary key is domainId and a secondary key is (domainId+status).

FIG. 3d illustrates a modified domain table 340 that has been modified relative to the domain table 330 to facilitate versioning. In FIG. 3d, the modified domain table 340 includes a domainId column 341, a version column 343, a name column 345, a status column 347, and one or more attributes columns 349. The modified domain table 340 also includes a first row 342 corresponding to a domainA, a second row 344 corresponding to a domainB, a third row 346 corresponding to domainC, and a fourth row 348 also corresponding to domainA. The first row 342 and the fourth row 346 of the modified domain table 340 both correspond to domainA, but the first row 342 has a version 0 and the fourth row 348 has a version 1, as illustrated in the version column 343 of the modified domain table 340. For the modified domain table, a primary key is (version+domainId) and a secondary key is (domainId+status). Although domainIds in the modified domain table 340 are not necessarily unique, the combination of a domainId and a version number provides a global unique identifier for identity domains having a domainId and version number. Also, duplicate entities that appear in different versions of an identity domain are distinguishable based on the global unique identifiers for the different versions of the identity domain regardless of whether the duplicate entities have the same entity identifier. In this way, duplicates for an entity for different versions of the identity domain are distinguishable by a primary key comprised of the global unique identifier assigned to the corresponding version of the identity domain and the entity identifier assigned to the entity.

FIG. 3e illustrates a first domain lookup table 350. In FIG. 3e, the first domain lookup table 350 includes a domainId column 351, a version column 353, and a status column 355. The domain lookup table 350 also includes a first row 352 corresponding to a domainA, a second row 354 corresponding to a domainB, a third row 356 corresponding to domainC, and a fourth row 358 also corresponding to domainA. The first row 352 and the fourth row 358 of the domain lookup table 350 both correspond to the domainA, but the first row 342 has a version of 0 and a status of "Active" and the fourth row 348 has a version of 1 and a status of "Snapshotting", as illustrated in the version column 353 and the status column 355 of the first domain lookup table 350.

FIG. 3f illustrates a second domain lookup table 360. In FIG. 3f, the second domain lookup table 360 includes a domainId column 361, a version column 363, and a status column 365. The second domain lookup table 360 also includes a first row 362 corresponding to domainB, a second row 364 corresponding to a domainC, a third row 366 corresponding to domainA, a fourth row 367 also corresponding to domainC, and a fifth row 368 also corresponding to domainC. As shown, the first row 362 and the second row 364 have a version number 0 and are active for domain and domainC, respectively. The third row 366 has version number 1 and is active for domainA. The fourth row 367 and fifth row 368 have version 1 and version 2, respectively, and have a status of "snapshotting" for domainC.

FIG. 3g illustrates a domain cleanup table 370. In FIG. 3g, the domain cleanup table 370 includes a domainId column 371, a version column 373, and a status column 375. The domain cleanup table 370 also includes a first row 372 corresponding to a domainA. As shown, the version for domainA in the first row 371 is version 0 and the status is "not_ready." In the example, the status indicates whether a version of a domain is ready for deletion.

FIG. 3h illustrates a domain cleanup table 380. In FIG. 3h, the domain cleanup table 380 includes a domainId column 381, a version column 383, and a status column 385. The domain cleanup table 380 also includes a first row 382 corresponding to version 0 of domainA with a status of "ready", a second row 384 corresponding to version 0 of domainC with a status of "not_ready", and a third row 386 corresponding to version 1 of domainC with a status of "ready".

In the example, userA has a userId "userA", a domainId "domainA", and a userName "A"; userB has a userId "userB", a domainId "domain", and a userName "B"; and userC has a userId "userC", a domainId "domainC", and a userName "C". Also, domainA has a name "A", domainB has a name "B", and domainC has a name "C".

FIGS. 3b, 3d, and 3e-3h illustrate consumption of an identity domain snapshot using versioning. In the example, snapshot generation, consumption, cleanup, and/or rollback occur for a system including identity domains domainA, domainB, and domainC. In various embodiments more or fewer users and/or identity domains may be present. The identity domains are logically and/or physically separated, (e.g., containerized), from each other.

In FIG. 3b, the system adds the fourth row 328 responsive to a snapshotting process beginning for userA of the modified user table 320. The fourth row 328 has an incremented version number in the version column 323 as compared to the previous row for the same userId (e.g., as compared to the first row 322 for userA).

In FIG. 3d, the fourth row 348 similarly reflects an incremented version number in the version column 343 of the modified domain table 340. The system adds the fourth row 348 responsive to a snapshotting process beginning for domainA of the modified domain table 340. The fourth row 348 is incremented as compared to the previous row for the same domainId (e.g., as compared to the first row 342).

FIG. 3e illustrates a first domain lookup table 350. In FIG. 3e, the version number of the fourth row 358 is incremented as compared to the version number of the previous row for the same domain (the first row 352, for domainA in the example). However, the status for domainA in the fourth row 358 is "Snapshotting," as recorded in the status column 355. In the example, the domain cleanup table 370 represents a state occurring while version 1 of domainA has a status of "snapshotting" and/or while version 0 of domainA still has a status of "Active."

Once consumption of the snapshot of version 1 of domainA is complete, the status for domainA is changed to "Active". In the illustration, the snapshotting status of version 1 of domainA represented as not completed or in progress in the domain lookup table 350 of FIG. 3e is represented with a status as having been completed with respect to the same version, version 1, of domainA in the domain lookup table 360 of FIG. 3f.

With reference to FIG. 3e-f, the first row 352 of the domain lookup table 350 for version 0 for domainA has been removed from the representation of the domain lookup table 360 of FIG. 3f relative to the domain lookup table 350 of FIG. 3e based on version 1 for domainA having a status set to Active. Responsive to the first row 352 of the domain lookup table 350 for version 0 for domainA being removed and/or version 1 of domainA being set to active in the domain lookup table 360, an entry for version 0 of domainA is added to a domain cleanup table 370 as described below.

FIG. 3g illustrates the first domain cleanup table 370. Version 0 of domainA is represented as "not ready" in the first row 372 because version 0 is still the active version of domainA (e.g., a snapshot has not yet been successfully consumed and activated).

Returning to FIG. 3f, the fourth row 367 and the fifth row 368 have been added responsive to snapshotting operations beginning for domainC. However, in this example, version 1 of domainC resulted in an error, inconsistency, or missing dependencies triggering a second updated version to be applied. In the example, the status for the fourth row 367 is indicated as "Ingestion_Failed" or "Snapshot_Ingestion-_Failed" responsive to the error, inconsistency, or missing dependencies being detected. Until an updated version is successfully consumed and activated, the prior version is not given a status of "ready" in the domain cleanup table 380. However, once snapshotting is initiated version 1 of domainC, the second row 384 of FIG. 3h is added with a "not_ready" status. Likewise, once snapshotting of version 2 of domainC is initiated, the third row 386 is added to the domain cleanup table 380 for version 1 of domainC with a "not_ready" status. If consumption of version 2 of domainC is successful, the status of version 0 and version 1 of domainC are changed to "ready" once version 2 of domainC becomes "active" in the domain lookup table 360. If consumption of version 2 of domainC is not successful, or if consumption of some other number of versions of domainC are not successful, the system rolls-back to the last stable version of the domain. By way of example, version 0 of domainC is a stable version. Version 1 of domainC is an attempted update to domainC which fails. Once one or more versions fail, version 0 of domainC remains active until another snapshot is received and/or an administrator action is taken. Thus, the failed version, version 1 has status changed to "ready" although the status of the last stable version, version 0 of domainC has status "not_ready".

FIG. 3h illustrates the second domain cleanup table 380. In FIG. 3h, version 0 of domainA has a status of "Ready" or "Ready_For_Deletion" responsive to consumption of the snapshot of version 1 of domainA being successfully completed. In some embodiments, the system checks for rollback conditions before adding a domain to the domain cleanup table 380 and/or before changing a status from "Not_Ready" to "Ready" (or similar status indicators). A cleanup operation of the system periodically checks for hanging or dangling entities. A hanging or dangling entity is an entity associated with a user and/or domain for which an updated version has been successfully applied. In the example, version 1 of domainA is successfully applied such that entities associated with version 0 of domainA are considered hanging entities. Rows from one or more entity tables having a matching domainId and version number (i.e. version 0 of domainA) are removed during the cleanup operation.

The second row 384 of the domain cleanup table for domainC is added responsive to initiation of an updated snapshot for domainC (e.g. for version 1 of domainC). The status for the second row 354 corresponding to version 0 of domainC is "not_ready." The third row 386 of the domain cleanup table 380 is added responsive to the initiation of a second updated snapshot for domainC (e.g. for version 2 of domainC). The system periodically checks whether consumption of an updated snapshot for domainC is complete. Responsive to the consumption of the snapshot of version 2 being successfully completed, the status for version 0 for domainC is changed to "ready" and the status for version 1 for domainC is changed to "Ready". If a rollback condition is determined in the system resulting from version 2 of domainC being consumed and/or activated, the status for version 2 of domainC is changed to "Snapshot_Complete" (or the like) and another version of domainC is set to active (e.g., the status of version 0 for domainC is set to active to roll the system back to using version 0 of domainC).

5. COMPUTER NETWORKS AND CLOUD NETWORKS

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis.

Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides the identity domain snapshot consumption using versioning system via a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment versions identity domain snapshot consumption system may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QOS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally, or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

6. MICROSERVICE APPLICATIONS

According to one or more embodiments, the techniques described herein are implemented in a microservice architecture. A microservice in this context refers to software logic designed to be independently deployable, having endpoints that may be logically coupled to other microservices to build a variety of applications, for example, by logically an identity domain snapshot consumption using versioning system to a software logic endpoint. Applications built using microservices are distinct from monolithic applications, which are designed as a single fixed unit and generally comprise a single logical executable. With microservice applications, different microservices are independently deployable as separate executables. Microservices may communicate using HyperText Transfer Protocol (HTTP) messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may additionally, or alternatively, provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In one or more embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a microservice, according to one or more embodiments. In other words, a microservice may trigger a notification (into the microservices manager for optional use by other plugged in applications, herein referred to as the "target" microservice) based on the above techniques and/or may be repre-sented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microser-vice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other microservices. Other microservices may per-form responsive actions based on the above techniques, including, but not limited to, deploying additional resources, adjusting system configurations, and/or generating GUIs.

Actions

In one or more embodiments, a plugged-in microservice application may expose actions to the microservices man-ager. The exposed actions may receive, as input, data or an identification of a data object or location of data, that causes data to be moved into a data cloud.

In one or more embodiments, the exposed actions may receive, as input, a request to increase or decrease existing alert thresholds. The input might identify existing in-appli-cation alert thresholds and whether to increase or decrease, or delete the threshold. Additionally, or alternatively, the input might request the microservice application to create new in-application alert thresholds. The in-application alerts may trigger alerts to the user while logged into the appli-cation, or may trigger alerts to the user using default or user-selected alert mechanisms available within the micro-service application itself, rather than through other applica-tions plugged into the microservices manager.

In one or more embodiments, the microservice applica-tion may generate and provide an output based on input that identifies, locates, or provides historical data, and defines the extent or scope of the requested output. The action, when triggered, causes the microservice application to provide, store, or display the output, for example, as a data model or as aggregate data that describes a data model.

7. HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field pro-grammable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to imple-ment the techniques.

Figure 4:
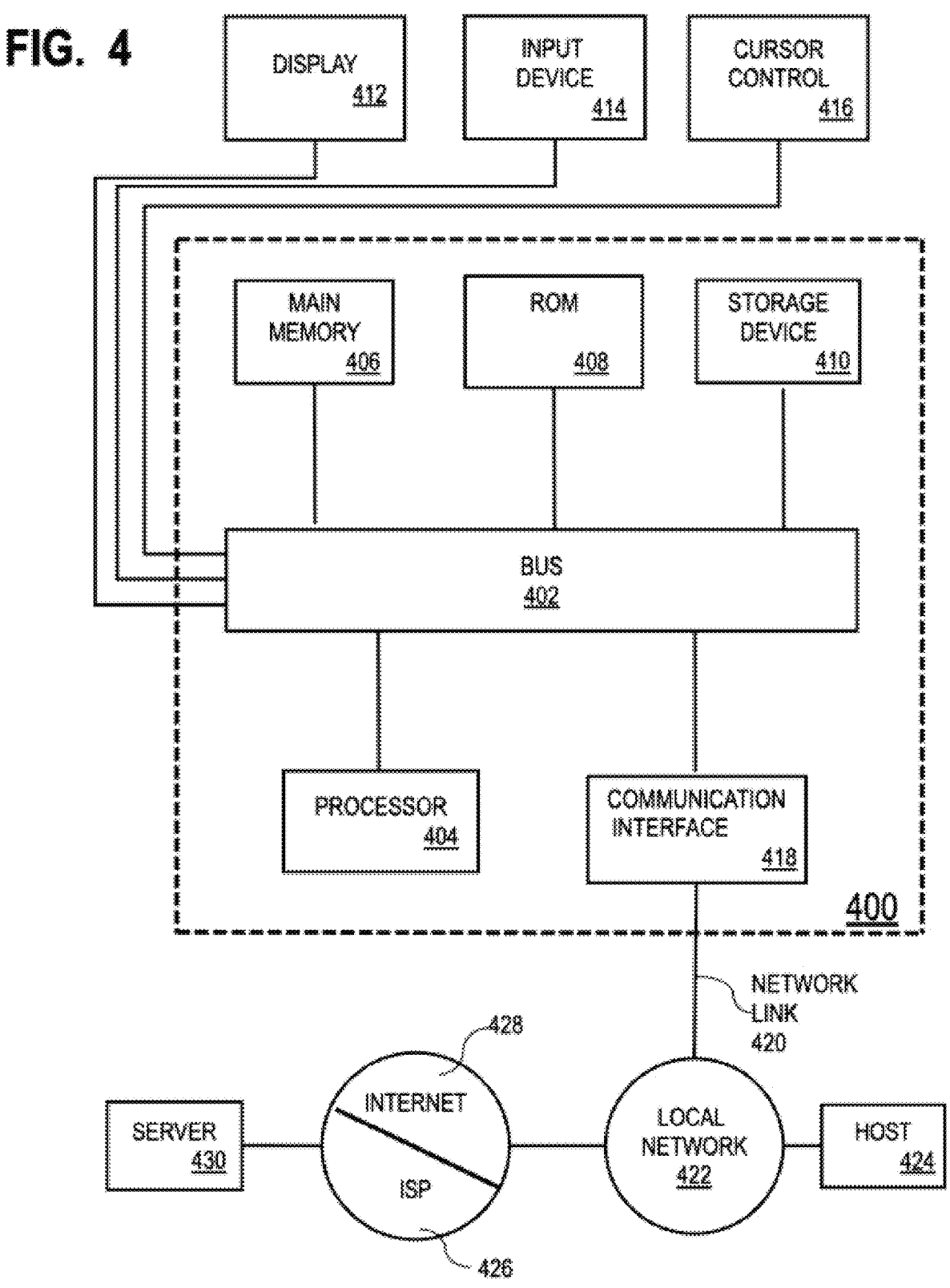
FIG. 4 illustrates a block diagram of an example computing device for performing identity domain snapshotting and/or consumption using versioning, in accordance with one or more embodiments.

For example, FIG. 4 is a block diagram that illustrates a computer system 400 upon which an embodiment of the disclosure may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary vari-ables or other intermediate information during execution of instructions to be executed by processor 404. Such instruc-tions, when stored in non-transitory storage media acces-sible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or a Solid State Drive (SSD) is provided and coupled to bus 402 for storing information and instruc-tions.

Computer system 400 may be coupled via bus 402 to a display 412, such as a cathode ray tube (CRT), for displaying information to a computer user. An input device 414, includ-ing alphanumeric and other keys, is coupled to bus 402 for communicating information and command selections to processor 404. Another type of user input device is cursor control 416, such as a mouse, a trackball, or cursor direction keys for communicating direction information and com-mand selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execu-tion of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

8. MISCELLANEOUS; EXTENSIONS; OTHER CONSIDERATIONS

Unless otherwise defined, all terms (including technical and scientific terms) are to be given their ordinary and customary meaning to a person of ordinary skill in the art, and are not to be limited to a special or customized meaning unless expressly so defined herein.

This application may include references to certain trademarks. Although the use of trademarks is permissible in patent applications, the proprietary nature of the marks should be respected and every effort made to prevent their use in any manner which might adversely affect their validity as trademarks.

Embodiments are directed to a system with one or more devices that include a hardware processor and that are configured to perform any of the operations described herein and/or recited in any of the claims below.

In an embodiment, one or more non-transitory computer readable storage media comprises instructions which, when executed by one or more hardware processors, cause performance of any of the operations described herein and/or recited in any of the claims.

In an embodiment, a method comprises operations described herein and/or recited in any of the claims, the method being executed by at least one device including a hardware processor.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. One or more non-transitory computer readable media comprising instructions which, when executed by one or more hardware processors, cause performance of operations comprising:

accessing a domain snapshot for an updated version of an identity domain;

loading entity data for a first entity from the domain snapshot into a data object associated with the identity domain;

updating metadata associated with the identity domain to reference the updated version of the identity domain;

activating the updated version of the identity domain by updating an active version of the identity domain to the updated version; and updating metadata for a related entity, the related entity being related to the first entity, to reference the entity data for the first entity loaded from the domain snapshot for the updated version of the identity domain.

2. The non-transitory media of claim 1, the operations further comprising:

loading entity data for a plurality of entities from the domain snapshot into a plurality of data objects associated with the identity domain during the loading of the entity data for the plurality of entities from the domain snapshot.

3. The non-transitory media of claim 1, the operations further comprising:

based on a prior version of the identity domain being the active version of the identity domain, returning, for the data object, the entity data loaded according to the prior version; and based on the updated version of the identity domain being the active version of the identity domain, returning, for the data object, the entity data loaded from the domain snapshot for the updated version.

4. The non-transitory media of claim 1, wherein:

activating the updated version of the identity domain comprises updating a domain lookup table to reference the updated version of the identity domain as the active version for the identity domain.

5. The non-transitory media of claim 1, the operations further comprising:

removing a prior record for a prior version of the identity domain from a domain lookup table;

adding a new record to a cleanup domain based on the prior record; and cleaning up the prior version of the identity domain by removing a dangling entity from the prior version of the identity domain.

6. The non-transitory media of claim 1, the operations further comprising:

routing traffic for a service to the updated version of the identity domain based on a global unique identifier for the updated version of the identity domain being mapped to an identity domain associated with the service.

7. The non-transitory media of claim 1, wherein:

duplicates for an identity-related entity for different versions of the identity domain are distinguished by a primary key comprised of a global unique identifier assigned to a corresponding version of the identity domain and an identifier assigned to the first entity.

8. The non-transitory media of claim 1, further comprising:

loading the entity data for the first entity by copying the entity data for the first entity and one or more related entities from the domain snapshot into one or more entity tables for the identity domain; and updating the metadata associated with the identity domain to reference the entity data for the first entity and one or more related entities from the domain snapshot copied into the one or more entity tables.

9. The non-transitory media of claim 1, further comprising:

responsive to detecting a failure condition associated with the updated version of the identity domain, updating a domain lookup table to reference the updated version of the identity domain as inactive and to reference a different version of the identity domain as active.

10. The non-transitory media of claim 1, further comprising:

storing up to a threshold number of prior versions of the identity domain in a cleanup domain;

in response to receiving a request to store an additional version of the identity domain exceeding the threshold number of prior versions, removing an oldest version of the identity domain from the cleanup domain; and storing the additional version of the identity domain in the cleanup domain.

11. A method comprising:

accessing a domain snapshot for an updated version of an identity domain;

loading entity data for a first entity from the domain snapshot into a data object associated with the identity domain;

updating metadata associated with the identity domain to reference the updated version of the identity domain;

activating the updated version of the identity domain by updating an active version of the identity domain to the updated version; and updating metadata for a related entity, the related entity being related to the first entity, to reference the entity data for the first entity loaded from the domain snapshot for the updated version of the identity domain, wherein the method is performed by at least one device including a hardware processor.

12. The method of claim 11, further comprising:

loading entity data for a plurality of entities from the domain snapshot into a plurality of data objects associated with the identity domain during the loading of the entity data for the plurality of entities from the domain snapshot.

13. The method of claim 11, further comprising:

based on a prior version of the identity domain being the active version of the identity domain, returning, for the data object, the entity data loaded according to the prior version; and based on the updated version of the identity domain being the active version of the identity domain, returning, for the data object, the entity data loaded from the domain snapshot for the updated version.

14. The method of claim 11, wherein:

activating the updated version of the identity domain comprises updating a domain lookup table to reference the updated version of the identity domain as the active version for the identity domain.

15. The method of claim 11, further comprising:

removing a prior record for a prior version of the identity domain from a domain lookup table;

adding a new record to a cleanup domain based on the prior record; and cleaning up the prior version of the identity domain by removing a dangling entity from the prior version of the identity domain.

16. The method of claim 11, further comprising:

routing traffic for a service to the updated version of the identity domain based on a global unique identifier for the updated version of the identity domain being mapped to an identity domain associated with the service.

17. The method of claim 11, further comprising:

loading the entity data for the first entity by copying the entity data for the first entity and one or more related entities from the domain snapshot into one or more entity tables for the identity domain; and updating the metadata associated with the identity domain to reference the entity data for the first entity and one or more related entities from the domain snapshot copied into the one or more entity tables.

18. A system comprising:

at least one device including a hardware processor;

the system being configured to perform operations comprising:

accessing a domain snapshot for an updated version of an identity domain;

loading entity data for a first entity from the domain snapshot into a data object associated with the identity domain;

updating metadata associated with the identity domain to reference the updated version of the identity domain; and activating the updated version of the identity domain by updating an active version of the identity domain to the updated version;

based on a prior version of the identity domain being the active version of the identity domain, returning, for the data object, the entity data loaded according to the prior version; and based on the updated version of the identity domain being the active version of the identity domain, returning, for the data object, the entity data loaded from the domain snapshot for the updated version.

19. The system of claim 18, wherein the operations further comprise:

updating metadata for a related entity, the related entity being related to the first entity, to reference the entity data for the first entity loaded from the domain snapshot for the updated version of the identity domain.

20. The system of claim 18, wherein the operations further comprise:

loading entity data for a plurality of entities from the domain snapshot into a plurality of data objects associated with the identity domain during the loading of the entity data for the plurality of entities from the domain snapshot.

\* \* \* \* \*